United States Patent [19]

Ogawa

[11] Patent Number: 5,568,623
[45] Date of Patent: Oct. 22, 1996

[54] METHOD FOR REARRANGING INSTRUCTION SEQUENCE IN RISC ARCHITECTURE

[75] Inventor: Yuji Ogawa, Tokyo, Japan

[73] Assignee: NEC Corporation, Tokyo, Japan

[21] Appl. No.: 387,393

[22] Filed: Feb. 13, 1995

Related U.S. Application Data

[63] Continuation of Ser. No. 836,653, Feb. 18, 1992, abandoned.

[30] Foreign Application Priority Data

Feb. 18, 1991 [JP] Japan .................................. 3-043987

[51] Int. Cl.⁶ .................................................. G06F 9/45
[52] U.S. Cl. ........................ 395/375; 395/600; 395/700; 395/800; 364/DIG. I; 364/DIG. II
[58] Field of Search .................................. 395/800, 375, 395/900, 600

[56] References Cited

U.S. PATENT DOCUMENTS

| | | | |
|---|---|---|---|
| 4,486,830 | 12/1984 | Taylor et al. | 364/141 |
| 4,789,925 | 12/1988 | Lahti | 364/318 |
| 4,814,976 | 3/1989 | Hansen et al. | 364/232.23 |
| 4,831,515 | 5/1989 | Kamada et al. | 364/232.22 |
| 4,891,754 | 1/1990 | Boreland | 364/244.6 |
| 5,185,868 | 2/1993 | Tran | 395/375 |
| 5,185,871 | 2/1993 | Frey et al. | 395/375 |
| 5,303,377 | 4/1994 | Gupta et al. | 395/700 |

OTHER PUBLICATIONS

The i960CA SuperScalar Implementation of the 80960 Architecture IEEE 1990 (S. McGeady).
A 32-Bit RISC processor Board for a frequency Hopping Radio. IEEE 1990 (T.S.D. Tsui et al.).

*Primary Examiner*—Krisna Lim
*Assistant Examiner*—Zarni Maung
*Attorney, Agent, or Firm*—Foley & Lardner

[57] ABSTRACT

In order to improve the efficiency with which a given set of instructions can be implemented in a RISC architecture environment, the set of instructions are subject to a plurality of requirements and the sequences of instructions which satisfy the requirements are listed. The most time efficient of the listed sequences is selected.

4 Claims, 5 Drawing Sheets

INST NO.

| | | |
|---|---|---|
| 1 | LD | %1, LABEL1 |
| 2 | SUB | %1, 1 |
| 3 | ST | %1, LABEL1 |
| 4 | LD | %2, LABEL2 |
| 5 | BEQ | %1, %2, LABEL3 |

14

INST NO.

| | | |
|---|---|---|
| 1 | LD | %1, LABEL1 |
| 1' | NOP | |
| 2 | SUB | %1, 1 |
| 3 | ST | %1, LABEL1 |
| 4 | LD | %2, LABEL2 |
| 4' | NOP | |
| 5 | BEQ | %1, %2, LABEL3 |
| 5' | NOP | |

ORIGINAL INST NO.

| | | |
|---|---|---|
| 1 | LD | %1, LABEL1 |
| 4 | LD | %2, LABEL2 |
| 2 | SUB | %1, 1 |
| 5 | BEQ | %1, %2, LABEL3 |
| 3 | ST | %1, LABEL1 |

FIG. 5

| INST | INPUT RESOURCE | OUTPUT RESOURCE | DELAY | BRANCH |
|---|---|---|---|---|
| LD | 2nd OPERAND | 1st OPERAND | YES | NO |
| SUB | 1st, 2nd OPERAND | 1st OPERAND | NO | NO |
| ST | 1st OPERAND | 2nd OPERAND | NO | NO |
| BEQ | 1st, 2nd OPERAND | NO | NO | YES |

FIG. 6

| INST NO. | INST | INPUT RESOURCE | OUTPUT RESOURCE |
|---|---|---|---|
| 1 | LD | MEMORY (LABEL1) | REGISTER (%1)(DELAY) |
| 2 | SUB | REGISTER (%1) | REGISTER (%1) |
| 3 | ST | REGISTER (%1) | MEMORY (LABEL1) |
| 4 | LD | MEMORY (LABEL2) | REGISTER (%2)(DELAY) |
| 5 | BEQ | REGISTER (%1, %2) | |

FIG. 7

| INST NO. | INST | INPUT RESOURCE GENERATING INSTRUCTION | INPUT RESOURCE DESTRUCTIVE INSTRUCTION |
|---|---|---|---|
| 1 | LD | | |
| 2 | SUB | 1 | |
| 3 | ST | 2 | 1 |
| 4 | LD | | |
| 5 | BEQ | 2   4 | 1 |

METHOD FOR REARRANGING INSTRUCTION SEQUENCE IN RISC ARCHITECTURE

This application is a continuation of application Ser. No. 07/836,653, filed Feb. 18, 1992, now abandoned.

BACKGROUND OF THE INVENTION

1. Field of the Invention

The present invention relates generally to a method and arrangement for rearranging an instruction sequence, and more specifically to such an arrangement and method for rearranging a sequence of instructions whose order of arrangement is subject to constraint such as in a reduced instruction set computer (RISC) architecture.

2. Description of the Prior Art

As is well known in the art, the RISC has emerged as a popular means of achieving high-performance computing. The RISC architectures take a dramatically different approach from that of systems which have been using even larger and more complex instruction sets. The RISC approach is to create a system which is simpler in architecture and faster in implementation than a complex instruction set computer (CISC) machine. That is, the RISC architecture realizes high-performance computing by reducing the burdens on a central processing unit (CPU) through reducing instructions and the resources of instructions.

However, compilers for RISC machines encounter some problems which are not experienced with conventional CISC compilers.

For example, in a RISC machine with a delayed branch, an instruction following the branch instruction will be executed irrespective of whether or not the branch is taken. Further, the executed result of a certain instruction is often not available to the instruction which immediately follows the same. In these situations, the simplest solution is simply to insert a non-operation (NOP) after each of the instructions wherein a delay is encountered. As an alternative to this simplistic solution, it has been proposed that instructions which are not effected by delays, be provided immediately after those which induce the same.

Accordingly, the RISC machine or RISC compiler has encountered the drawback that it is often difficult to arrange the instructions exactly in accordance with a job design and in the same manner as is possible with conventional type complex instruction set (CISC) machines.

SUMMARY OF THE INVENTION

It is an object of the present invention to provide a method by which an instruction sequence is rearranged to effectively exhibit advantages of RISC machines.

Another object of the present invention is to provide an arrangement by which an instruction sequence is rearranged to effectively exhibit advantages of RISC machines.

In brief, the above objects are achieved by an arrangement wherein the set of instructions which are to be implemented are subject to a plurality of requirements and the sequences of instructions which satisfy the requirements are listed. The most time efficient of the listed sequences is selected.

One aspect of the present invention comes in a method of rearranging a set of instructions which features the steps of: determining which instruction or instructions must be implemented before any given instruction is carried out; determining which instruction must not be implemented between any given instruction and the instruction or instructions which must be implemented therebefore; determining if a predetermined instruction is in one of first and second predetermined positions in the sequence in which the set of instructions will be implemented; listing the instruction sequence or sequences which will satisfy the above requirements; and selecting the sequence of the listed sequences which can be implemented in the shortest time.

Another aspect of the present invention comes in a computer arrangement for rearranging a set of instructions which features: means for determining which instruction or instructions must be implemented before any given instruction is carried out; means for determining which instruction must not be implemented between any given instruction and the instruction or instructions which must be implemented therebefore; means for determining if a predetermined instruction is in one of first and second predetermined positions in the sequence in which the set of instructions will be implemented; means for listing the instruction sequence or sequences which will satisfy the above requirements; and means for selecting the sequence of the listed sequences which can be implemented in the shortest time.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 5 is a list table listing the definitions of the instructions of FIG. 2;

FIG. 6 is a list table showing an input/output resource information;

FIG. 7 is a list table showing instruction depending input resource information;

FIG. 8 is a list table showing optimum instruction sequences derived using the list table of FIG. 7.

DETAILED DESCRIPTION OF THE PREFERRED EMBODIMENTS

Figure 1:
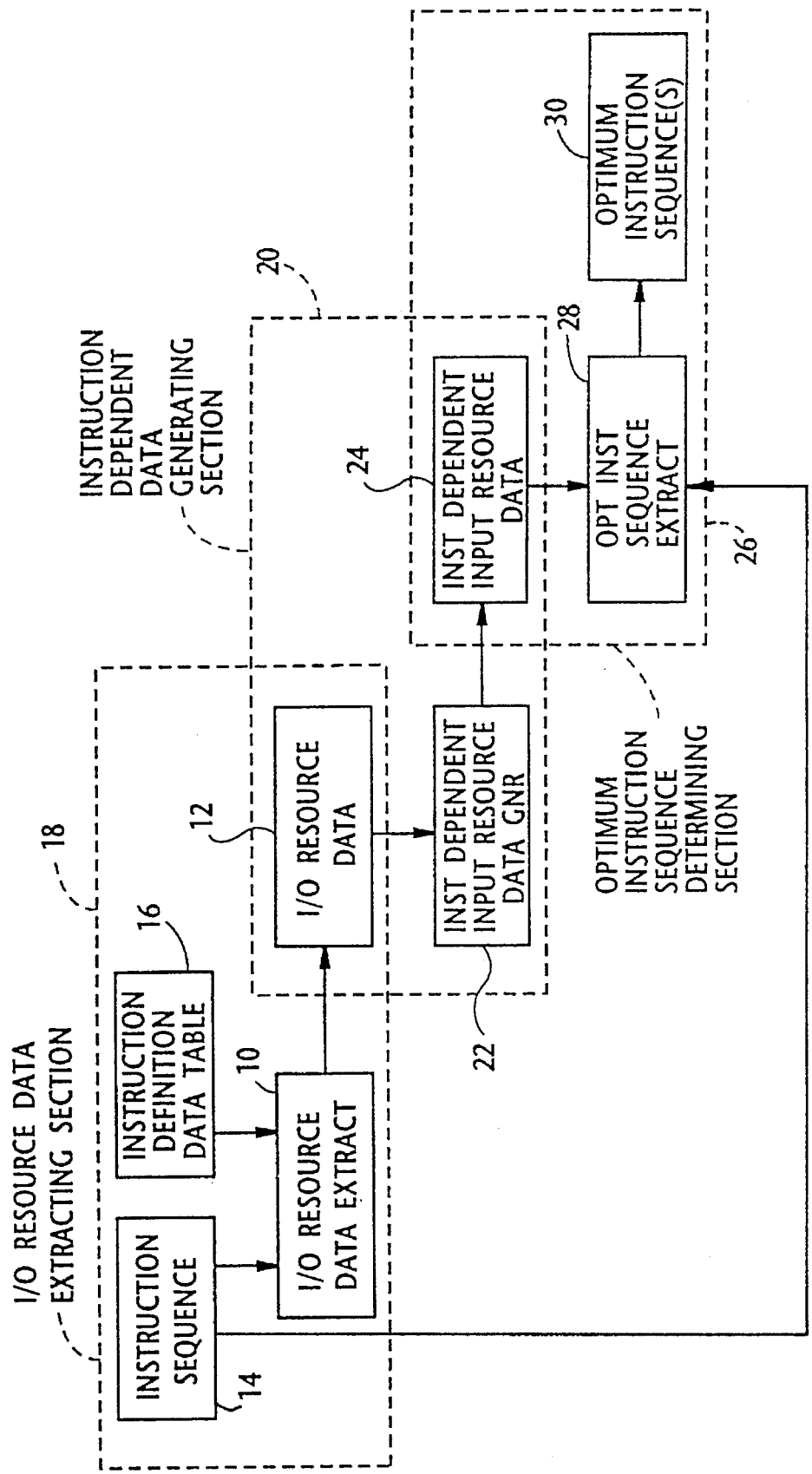
FIG. 1 is a functional block diagram which characterizes an overall operation of the present invention.

FIG. 1 is a block diagram for schematically showing a functional arrangement which characterizes the operations of the present invention.

In FIG. 1, an input/output resource information extracting portion 10 is provided for obtaining input/output resource information 12 by referring to an instruction sequence 14 and an instruction definition table 16. These blocks 10, 12, 14 and 16 are functionally depicted as an input/output resource extracting section 18. The instruction sequence 14 is exemplified in FIG. 2 while the instruction definition table 16 is shown in FIG. 5. Further, the input/output resource information derived from FIGS. 2 and 5 is shown in FIG. 6.

An instruction depending data generating section 20, which overlaps in part the section 18, includes the aforesaid input/output resource data block 12, an instruction dependent input resource data generator 22 and an instruction dependent input resource data 24. The instruction dependent resource data 24 is shown in FIG. 7. As shown, the block 24 is shared by the following section 26.

Lastly, the optimum instruction sequence determining section 26 is comprised of the aforesaid block 24, an optimum instruction sequence extractor 28 and optimum instruction sequences 30.

Figures 2, 3, 4:
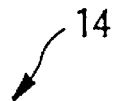
FIG. 2 is a list table showing an example of an instruction sequence which can be implemented by a CISC and which will be used in connection with a discussion of the invention.
FIG. 3 is a list table showing the instruction sequence of FIG. 2 and non-operation codes inserted therebetween.
FIG. 4 is a list table showing the optimum sequence of instructions derived using the present invention.

Reference is made to FIG. 2, wherein there is shown an instruction sequence 14, which is suited for execution in a CISC system and which includes five instructions No. 1–5 in this particular case. In FIG. 2, the first to fifth instruction codes are as follows:

(1) LD %1, LABEL1:

Load data stored in a memory defined by the second operand (LABEL1) into register defined by the first operand (%1);

(2) Sub %1, 1:

Subtract an immediate value "1" of the second operand from data stored in register indicated by the first operand (%1);

(3) ST %1, LABEL1:

Store data in register defined by the first operand (%1) into memory defined by the second operand (LABEL1);

(4) LD %2, LABEL2:

Load data stored in a memory defined by second operand (LABEL2) in a register defined by the first operand (%2); and (5) BEQ %1, %2, LABEL3:

Compare data stored in the registers defined by first and second operands (%1 and %2), and if equal jump to an instruction defined by third operand (LABEL3).

In this example, the LD instruction is a delayed load instruction and hence the executed result is not available to an instruction immediately thereafter. Further, the BEQ instruction is a delayed branch instruction and accordingly, an instruction following the BEQ instruction will be executed whether or not the branch is taken.

Therefore, in order to assure correct operations of the instruction sequence 14 of FIG. 2 in a RISC environment, without any rearrangement thereof, it is necessary to insert NOPs after the instructions Nos. 1, 4 and 5 as shown in FIG. 3. However, as will be readily appreciated, this measure is quite inefficient.

FIG. 4 shows the result of the instruction sequence arrangement which is achieved in accordance with the present invention and which will be discussed in more detail later.

FIG. 5 is a table which organizes the four instructions shown in FIG. 2 in terms of whether they are an input resource or an output resource, and further indicates if a delay or branch operation occurs. FIG. 6 on the other hand, is a table which is compiled based on the content of FIGS. 2 and 5 and which lists the input and output resources in terms of whether they are memory or register.

FIG. 7 is a table wherein the instructions are organized in terms of whether they are an input resource generating instruction or input resource destructive instruction. This table further nominates which instruction must have been previously executed and which instruction cannot be permitted to be executed before another instruction.

A further requirement which must be met in accordance with the present invention is that the branch instruction be either the last or second to last instruction of the sequence. If all of the above three requirements are met, viz., the instruction(s) required for a subsequent instruction has already been executed, a destructive instruction(s) does not precede an instruction whose input resource is destroyed thereby, and the branch instruction is either the last or second to last of the sequence, then the sequence can be correctly executed in a RISC environment.

FIG. 8 lists the 7 possible sequences which meet all of the above 3 basic requirements. As will be appreciated the fifth sequence is the shortest and therefore the most efficient (timewise). By selecting the most efficient of the list of possibilities and implementing the same, it is possible to improve the overall operation.

The optimal instruction sequence extraction element (see #28 in FIG. 1) performs the above mentioned task of determining which of the listed acceptable sequences is the most efficient (in this case the shortest) and transfers this sequence data to block 30.

Figure 9:
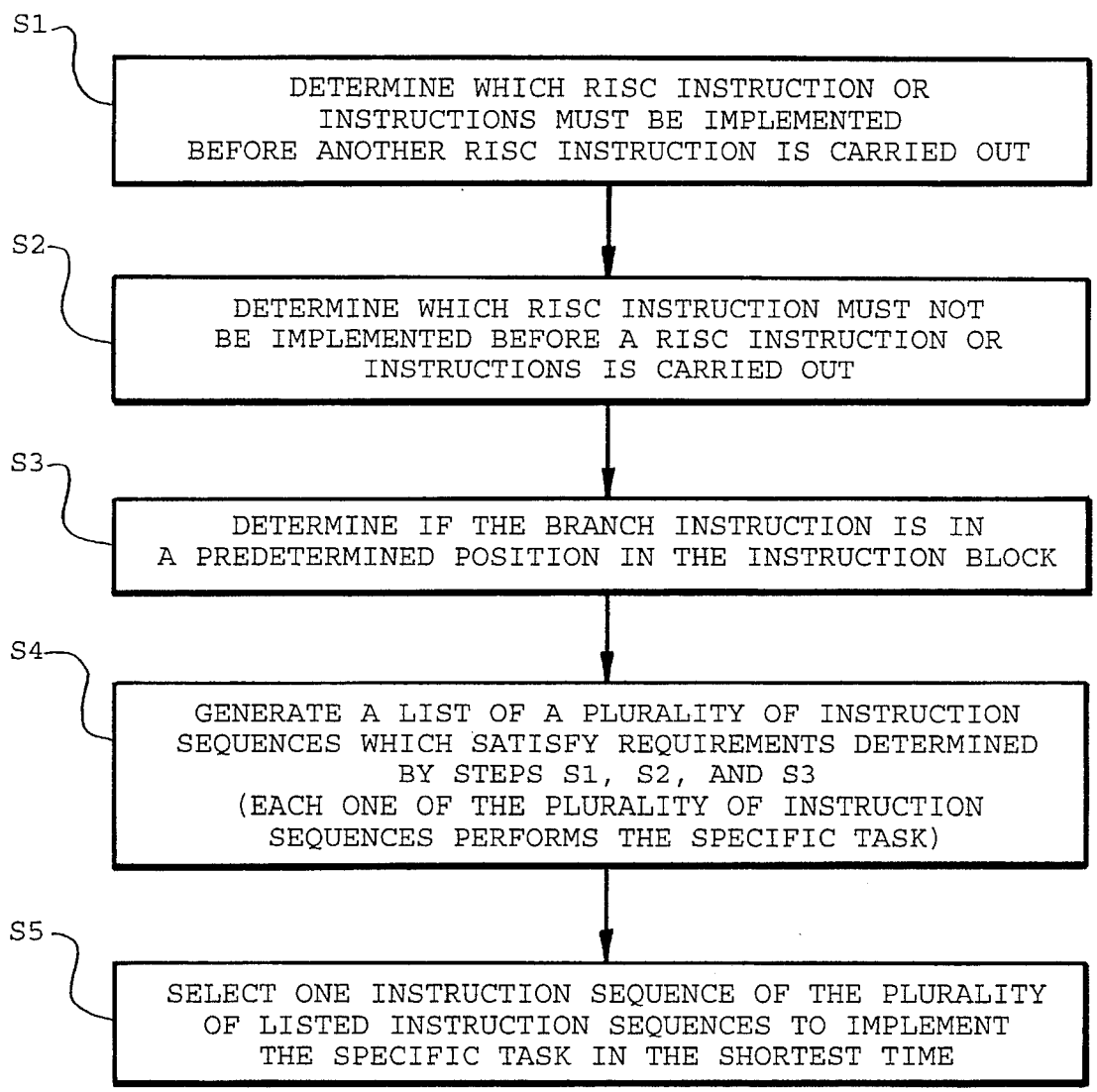
FIG. 9 is a flowchart of a method of rearranging RISC program instructions according to one embodiment of the invention.

FIG. 9 is a flowchart which illustrates a method of rearranging RISC program instructions according to one embodiment of the invention. The program instructions perform a specific task and include a branch instruction and together constitute an instruction block. The steps in FIG. 9 are implemented in a computer. In step S1, the computer determines which RISC instruction or instructions must be implemented before another RISC instruction is carried out. In step S2, the computer determines which RISC instruction must not be implemented before a RISC instruction or instructions is carried out. In step S3, the computer determines if the branch instruction is in a predetermined position in the instruction block. In step S4, the computer generates a list of a plurality of instruction sequences which satisfy requirements determined in steps S1, S2, and S3. Each one of the plurality of instruction sequences performs the specific task. Finally, in step S5, the computer selects one instruction sequence of the plurality of listed instruction sequences to implement the specific task in the shortest time.

While the foregoing description describes an embodiment of present invention, the various alternatives and modifications possible without departing from the scope of the present invention, which is limited only by the appended claims, will be apparent to those skilled in the art.

What is claimed is:

1. A method of rearranging RISC (reduced instruction set computer) program instructions which together perform a specific task and which include a branch instruction and which constitute an instruction block, comprising the following steps implemented in a computer:

(a) determining, in said computer, which RISC instruction or instructions must be implemented before another RISC instruction is carried out;

(b) determining, in said computer, which RISC instruction must not be implemented before a RISC instruction or instructions is carried out;

(c) determining, in said computer, if said branch instruction is in a predetermined position in said instruction block;

(d) listing, in said computer, a plurality of instruction sequences which satisfy requirements determined by steps (a), (b) and (c), each one of said plurality of instruction sequences performing said specific task; and (e) selecting, in said computer, one instruction sequence of a plurality of listed instruction sequences to implement said specific task in a shortest time.

2. A method as claimed in claim 1, wherein said instruction block has a single instruction entrance and a single instruction exit which corresponds to said branch instruction.

3. A method as claimed in claim 1, wherein said branch instruction is positioned in either a last instruction step or a second to last instruction step in said instruction block.

4. A method of rearranging RISC (reduced instruction set computer) program instructions which together perform a specific task and which include a branch instruction and which constitute an instruction block, comprising the following steps implemented in a computer:

(a) determining, in said computer, which operand or operands must be defined before each of said RISC instructions is carried out;

(b) determining, in said computer, which RISC instruction destroys an operand to be operated on by another RISC instruction;

(c) determining, in said computer, if said branch instruction is in a predetermined position in said instruction block;

(d) listing, in said computer, a plurality of instruction sequences which satisfy requirements determined by steps (a), (b) and (c), each one of said plurality of instruction sequences performing said specific task; and (e) selecting, in said computer, one instruction sequence of a plurality of listed instruction sequences to implement said specific task in a shortest time.

\* \* \* \* \*